Patented Mar. 14, 1933

1,901,565

UNITED STATES PATENT OFFICE

RICHARD PASTERNACK AND CLINTON P. AMMERMAN, OF BROOKLYN, NEW YORK, ASSIGNORS TO CHARLES PFIZER & COMPANY, OF BROOKLYN, NEW YORK, A CORPORATION OF NEW JERSEY

AMIDES OF D-GLUCONIC ACID

No Drawing. Application filed July 19, 1930. Serial No. 469,264.

This invention relates to an amide of d-gluconic acid and process of preparing same.

It has been found that by reacting p-phenetidine with a lactone of d-gluconic acid that d-glucono p-phenetid may be obtained. This compound has not heretofore been known. It is a white crystalline compound having a melting point of 177° C. and is of therapeutic value.

The reaction may be carried out by mixing p-phenetidine and any of the lactones of d-gluconic acid, in stoichiometric proportions or with an excess of one or the other, with a solvent such as methyl or ethyl alcohol and heating the reaction liquid to raise the temperature at least slightly, i. e. about 50° C., to enable the reaction to go forward at a practically feasible speed. Temperatures above 160° C., which could be attained by carrying out the reaction under pressure, should be avoided due to the danger of decomposition. The liquid used as a solvent should be a good solvent for at least one of the reactants and should not react with the resulting product.

The d-glucono delta-lactone and d-glucono gamma-lactone are particularly suited for this reaction, the method of carrying out the reaction and the resulting compound being the same regardless of which lactone is used.

The reaction may also be carried out by heating p-phenetidine and a lactone of d-gluconic acid in the absence of any solvent or diluent at about 120° C. but not substantially above 160° C. at which temperature decomposition is apt to occur. The p-phenetidine and lactone may be reacted in stoichiometric proportions or with an excess of either. The crude d-glucono p-phenetid may then be dissolved in water and crystallized out. The reaction is substantially complete after ½ hour at 120° C. in the absence of a solvent or after 10 hours in the presence of methanol.

The reaction may be represented as follows, using d-glucono delta lactone as the specific lactone:

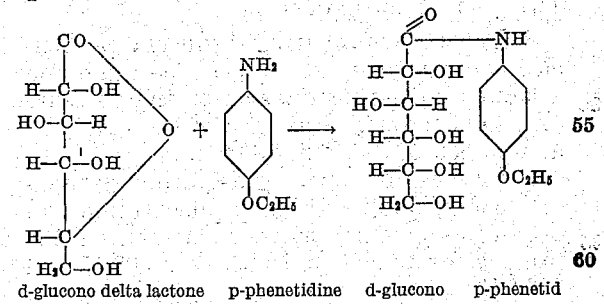

d-glucono delta lactone  p-phenetidine  d-glucono p-phenetid

The following specific examples are given to illustrate the invention:

*Example I.*—137 parts p-phenetidine, 178 parts d-glucono delta-lactone, and 120 parts of methanol are heated in a vessel provided with a reflux condenser for 10 hours on a steam bath. As the reaction reaches completion d-glucono p-phenetid solidifies. The methanol is then distilled off and the crude phenetid is dissolved in water and recrystallized. Pure d-glucono p-phenetid is obtained as a white crystalline compound melting at 177° C.

*Example II.*—137 parts p-phenetidine, and 187 parts d-glucono gamma-lactone (5% excess) are heated to 120° C. for ½ hour. During the heating the lactone dissolves in the amine very rapidly, so that a homogeneous melt results, and soon thereafter the reaction product solidifies. The crude d-glucono p-phenetid thus obtained is purified by recrystallization from alcohol or water.

The invention claimed is:

1. d-glucono p-phenetid.
2. d-glucono p-phenetid, being a white crystalline substance having a melting point of 177° C.

3. A white crystalline substance having a melting point of 177° C. and the formula

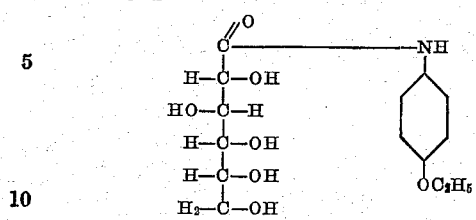

4. Process of preparing d-glucono p-phenetid comprising reacting at below 160° C. p-phenetidine and a lactone of d-gluconic acid.

5. Process of preparing d-glucono p-phenetid comprising reacting at below 160° C. p-phenetidine and d-glucono gamma or delta lactone.

6. Process of preparing d-glucono p-phenetid comprising reacting p-phenetidine and a lactone of d-gluconic acid at about 120° and below 160° C.

7. Process of preparing d-glucono p-phenetid comprising reacting p-phenetidine and d-glucono gamma or delta lactone at about 120° and below 160° C.

8. Process of preparing d-glucono p-phenetid comprising reacting p-phenetidine and a lactone of d-gluconic acid in the presence of a solvent for at least one of the reactants at between 50° C. and 100° C.

9. Process of preparing d-glucono p-phenetid comprising reacting p-phenetidine and d-glucono gamma or delta lactone in the presence of an alcohol at between 50° C. and 100° C.

10. Process of preparing d-glucono p-phenetid comprising reacting p-phenetidine and d-glucono gamma or delta lactone in the presence of an alcohol selected from the group comprising methyl and ethyl alcohol at not above about 100° C. for several hours.

11. Process of preparing d-glucono p-phenetid comprising reacting p-phenetidine and d-glucono gamma or delta lactone in the presence of methanol at not above about 100° C. for several hours.

12. Process of preparing d-glucono p-phenetid comprising heating a mixture of p-phenetidine and a lactone of d-gluconic acid in the absence of a solvent until said mixture melts but not substantially above 160° C.

13. Process of preparing d-glucono p-phenetid comprising heating a mixture of p-phenetidine and d-glucono gamma delta lactone in the absence of a solvent until said mixture melts but not substantially above 160° C.

Signed at Brooklyn, in the county of Kings and State of New York, this 17th day of July A. D. 1930.

RICHARD PASTERNACK.
CLINTON P. AMMERMAN.